Patented Feb. 5, 1952

2,584,409

UNITED STATES PATENT OFFICE 2,584,409

PREPARATION OF AROMATIC NITRILES

Vernon P. Wystrach, Springdale, Conn., assignor to American Cyanamid Company, New York, N. Y., a corporation of Maine No Drawing. Application January 27, 1950, Serial No. 140,960

8 Claims. (Cl. 260—465)

The present invention relates to the preparation of aromatic nitriles by condensing an aromatic compound with a cyanogen halide in the presence of a considerable excess of hydrogen fluoride.

More particularly, the invention relates to the preparation of aromatic nitriles of the formula

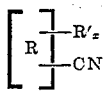

by condensing an aromatic compound of the formula

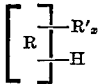

with a cyanogen halide in the presence of hydrogen fluoride at a condensation temperature. In the above formulas R is an aromatic hydrocarbon residue, R' is hydrogen, alkyl, or alkoxy, and $x$ an integer.

It is an object of the invention to prepare aromatic nitriles more cheaply than has been formerly possible. It is a further object of the invention to condense a monocarbon halide with an aromatic compound in the presence of hydrogen fluoride. Additional objects will be apparent from the discussion hereinafter.

It is surprising that a monocarbon halide could be condensed with an aromatic compound in the presence of hydrogen fluoride, since it was heretofore believed that to be capable of condensing, the compound had to contain at least two carbon atoms, preferably three or more. (See Cattell, Journal of the American Chemical Society, vol. 61, p. 1010 [1939].) It is further surprising that the cyanogen halides could be used in such a reaction, as it is well known that said halides polymerize readily to the corresponding cyanuric halides under many reaction conditions, especially in the presence of hydrogen chloride and hydrogen bromide, and it is further well known that hydrogen fluoride is an excellent polymerization agent. It was therefore not to be expected that any cyanogen halide could be condensed with an aromatic compound in the presence of hydrogen fluoride. The present invention, however, proves the feasibility of such a condensation.

In general, the condensation may be carried out along the lines well known in the art for alkylating or acylating aromatic compounds in the presence of hydrogen fluoride. For example, the reactions are preferably conducted at low temperatures and with a considerable excess of hydrogen fluoride. Temperatures in excess of boiling of hydrogen fluoride may, however, be used if the reaction is conducted under superatmospheric pressure.

It has been found that the following generalized procedure gives excellent results. Liquid hydrogen fluoride is poured into a pre-cooled (about 0° C.) reaction vessel equipped with a liquid-addition inlet, stirrer, and $H_2F_2$ condenser or trap. Thereafter a solution of cyanogen halide in the cold aromatic compound (about 0° C.) is added. When a solid aromatic, such as naphthalene or the like, is to be reacted, the solid compound is preferably dissolved in a suitable inert solvent such as chloroform, the cyanogen halide is then mixed in said solution, and the resulting solution is poured into the hydrogen fluoride. If desired, however, the order of addition of reagents can be reversed. Stirring is then begun and the temperature of the reaction mixture is permitted to rise to room temperature as the reaction proceeds. By-product hydrochloric acid is led off in the usual way, while any hydrogen fluoride evolved is condensed and returned to the reaction vessel. Twenty hours generally suffices to complete the reaction.

The products are isolated in the usual manner. For example, the reaction mixture is poured onto cracked ice, and the organic layer is separated from the aqueous layer. All hydrogen fluoride present is dissolved in the water. To recover residual matter in the reaction vessel, the vessel is washed with suitable solvents, such as ether and water in sequence, and the combined washings added to the aqueous layer. The aqueous layer is then extracted with several portions of a suitable solvent, for example, three portions of ether, 100 ml./portion, and these extractions are combined and kept separate. The organic layer in the ether extracts is separately shaken with cold water, followed by scrubbing with a sodium hydroxide solution to remove hydrogen halides and cyanogen halide. The combined extracts and product layer are then distilled, for example, in a 24 x 1 inch Stedman column to remove ether and unreacted aromatic compound. The nitrile is then stripped through the column at subatmospheric pressure and recovered.

An alternative recovery procedure is to distill off $H_2F_2$ and unreacted reagents at 50°–150° C., and thereafter to work up the product by emptying the contents of the still into water and proceeding as above.

Using the above generalized procedure, various aromatic compounds were reacted with cyanogen chloride, as detailed in the following examples.

*Example 1*

Benzene (200 ml.) was reacted with one mol of cyanogen chloride in the presence of 420 g. of hydrogen fluoride to provide a fair yield of benzonitrile.

*Example 2*

Toluene (200 ml.) was reacted with ½ mol of cyanogen chloride in the presence of 210–215 g. of hydrogen fluoride to produce 21.5 g. of mixed tolunitriles, a 37% yield.

*Example 3*

Ethylbenzene (100 ml.) was reacted with ½ mol of cyanogen chloride in the presence of 210–215 g. of hydrogen fluoride to provide a mixture of 11.5 g. of mixed ethylbenzonitriles, boiling at 118°–122° C. at 32 mm. Hg, a yield of 18%.

*Example 4*

Iso-propylbenzene (100 ml.) was reacted with ½ mol of cyanogen chloride in the presence of 210–215 g. of hydrogen fluoride to provide 8.5 g. of mixed iso-propylbenzonitriles, boiling at about 100° C. at 20 mm. Hg, a yield of 12%.

*Example 5* m-Xylene (200 ml.) was reacted with 1.1 mols of cyanogen chloride in the presence of 430 g. of hydrogen fluoride to provide 129 g. of mixed dimethyl benzonitriles, boiling at 123°–126° C. at 39 mm. Hg, a yield of 90%.

*Example 6*

Mesitylene (200 ml.) was reacted with 1.05 mols of cyanogen chloride in the presence of 435 g. of hydrogen fluoride to provide 151 g. of 2,3,6-trimethyl benzonitrile, boiling at 138.5° C. at 40 mm. Hg, to 141° C. at 43 mm. Hg, a yield of 99%.

*Example 7* m-Diethylbenzene (100 ml.) was reacted with ½ mol of cyanogen chloride in the presence of 210–215 g. of hydrogen fluoride to provide 30 g. of mixed diethylbenzonitriles, boiling at 76°–78° C. at 1 mm. Hg, a yield of 38%.

*Example 8*

Naphthalene (64 g.) dissolved in 150 ml. of chloroform was reacted with ½ mol of cyanogen chloride in the presence of 210–215 g. of hydrogen fluoride to provide a fair yield of mixed naphthanitriles.

*Example 9*

Anisole (200 ml.) was reacted with 1 mol of cyanogen chloride in the presence of 425 g. of hydrogen fluoride to provide 43 g. of mixed methoxybenzonitriles, a yield of 32%.

In each of the above example the reaction temperature was initially about 0° C., and the reaction mass was stirred overnight and allowed to rise to room temperature during this period.

In the above examples, cyanogen chloride was used, but other cyanogen halides, such as the bromide, are also suitable. Cyanogen bromide, a solid, is preferably dissolved or slurried in the aromatic compound and the thus-formed dispersion added to the hydrogen fluoride as in the procedure with cyanogen chloride.

As in the prior art condensations with hydrogen fluoride, a considerable excess of this catalyst should be used, i. e., preferably at least 10 mols per mol of cyanogen halide, and still more preferably, 20 mols, or even more.

While the invention has been described with particular reference to specific embodiments, it is to be understood that it not to be limited thereto but is to be construed broadly and restricted solely by the scope of the appended claims.

I claim:

1. The process of preparing an aromatic nitrile of the formula

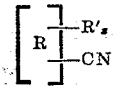

that comprises subjecting an aromatic compound of the formula

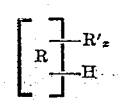

to the action of cyanogen chloride in the presence of hydrogen fluoride and recovering the thus-formed aromatic nitrile; R being an aromatic hydrocarbon residue, R' being a member of the group consisting of hydrogen, alkyl, and alkoxy, and x being an integer.

2. The method according to claim 1 in which R' is alkyl.

3. The method according to claim 1 in which R' is alkoxy.

4. The process of preparing an eso-cyano mesitylene that comprises subjecting mesitylene to the action of cyanogen chloride in the presence of hydrogen fluoride and recovering from the thus-formed reaction mass an eso-cyano mesitylene.

5. The process of preparing an eso-cyano m-xylene that comprises subjecting m-xylene to the action of cyanogen chloride in the presence of hydrogen fluoride and recovering from the thus-formed reaction mass an eso-cyano m-xylene.

6. The process of preparing an eso-cyano toluene that comprises subjecting toluene to the action of cyanogen chloride in the presence of hydrogen fluoride and recovering from the thus-formed reaction mass an eso-cyano toluene.

7. The process of preparing an eso-cyano anisole that comprises subjecting anisole to the action of cyanogen chloride in the presence of hydrogen fluoride and recovering from the thus-formed reaction mass an eso-cyano anisole.

8. The process of preparing an eso-cyano diethylbenzene that comprises subjecting diethylbenzene to the action of cyanogen chloride in the presence of hydrogen fluoride and recovering from the thus-formed reaction mass an eso-cyano diethylbenzene.

VERNON P. WYSTRACH.

REFERENCES CITED

The following references are of record in the file of this patent:

Karrer et al., Chem. Abstracts, vol. 14, p. 743 (1920).

Karrer et al., Chem. Abstracts, vol. 14, p. 1973 (1920).

Adams et al., "Organic Reactions," vol. 3, p. 2 (1946).

Migrdichian, "Chem. of Org. Cyanogen Compounds," p. 112 (1947).